Figure 1:
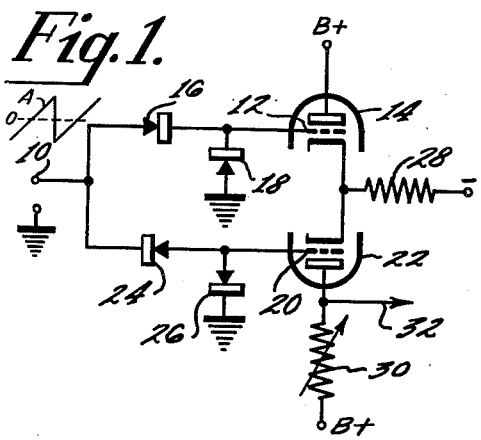

Feb. 22, 1955 W. E. WOODS 2,702,854
NULL DETECTOR
Filed Dec. 22, 1953

INVENTOR.
William E. Woods
BY Morris R. Relain
ATTORNEY

United States Patent Office 2,702,854
Patented Feb. 22, 1955

2,702,854

NULL DETECTOR

William E. Woods, Haddonfield, N. J., assignor to Radio Corporation of America, a corporation of Delaware Application December 22, 1953, Serial No. 399,701

12 Claims. (Cl. 250—27)

This invention relates generally to null detectors, and more particularly to a null detector circuit for producing an output signal at the instant of time when one or more input signals pass through a predetermined voltage. While neither specifically nor exclusively limited thereto, the null detector of the present invention is particularly useful in electronic locating, telemetering, and radar systems generally.

It has been proposed previously to use null detector circuits wherein threshold circuits are triggered by incoming signals, and wherein the signals are mixed and then detected. In some of these prior art null detectors, the circuit sensitivity depends upon the rate of approach, and/or the direction of approach, of the incoming signal to the null point. In order to increase the sensitivity of these null detectors, it has been necessary to increase the circuit complexity with a resultant increase in cost and weight of the apparatus.

It is, therefore, a principal object of the present invention to provide an improved null detector which will overcome the above-mentioned objections.

It is a further object of the present invention to provide an improved null detector that is sensitive to both positive- and negative-going signals, and which is not affected by the rate of approach of the incoming signal to the null point.

It is still a further object of the present invention to provide an improved null detector of the type described which is relatively simple in structure and function, relatively inexpensive and yet highly efficient in use.

These and further objects of the present invention are attained in an improved null detector of the type wherein an output signal is produced when an incoming signal passes through a voltage of a predetermined level. The null detector of the present invention comprises a difference amplifier having a pair of triodes which share a common cathode resistor. The signal input to the grid of each of the triodes is introduced through two parallel circuit branches, providing positive and negative polarity limiting, or gating, respectively. Each one of the parallel circuit branches comprises a pair of diodes connected in a series opposing circuit between an input terminal and a source of reference potential. A pair of diodes in one of the circuit branches is connected in a manner to permit current to flow in its circuit in a direction opposite to that permitted by a pair of diodes in the other of the circuit branches. Where it is desired to determine the point at which a plurality of incoming signals pass through a reference voltage level simultaneously, the input circuit of the present invention may be adapted to accommodate a plurality of such signals. The null point is determined by an output signal derived from the anode of one of the triodes of the difference amplifier.

Figure 2:
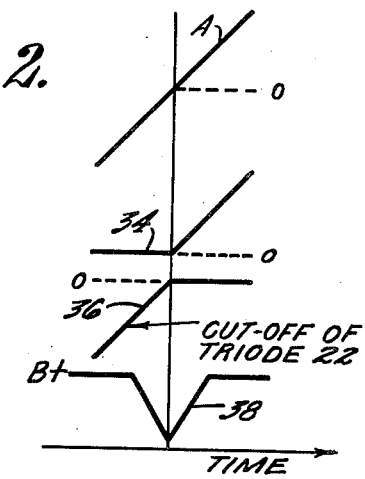
Figure 3:
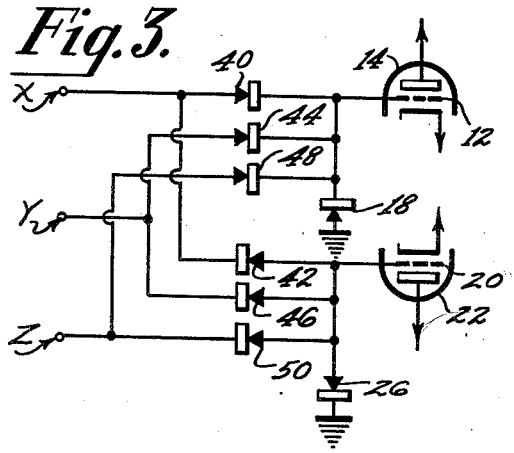
Figure 4:
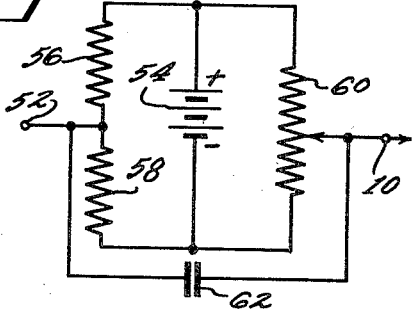
Figure 5:
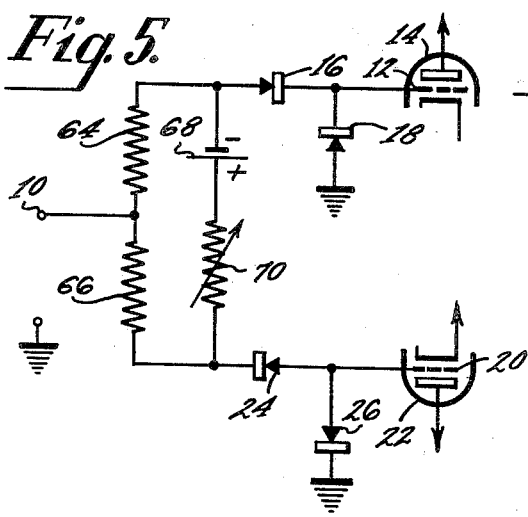
Figure 6:
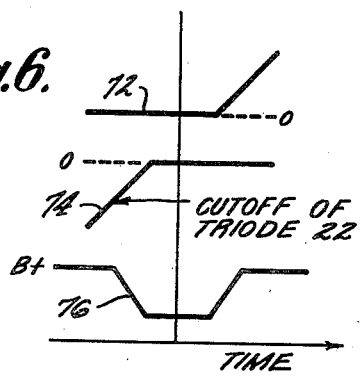

The novel features of the present invention as well as the invention itself, both as to its organization and method of operation, will be understood in detail from the following description, when considered in connection with the accompanying drawing in which similar reference numerals refer to similar elements, and in which:

Fig. 1 is a schematic diagram of a null detector in accordance with the present invention;

Fig. 2 is a representation of a series of voltage waveforms used to explain the operation of the null detector of Fig. 1, Fig. 3 is a schematic diagram of a modification of the input circuit of the null detector of Fig. 1, Fig. 4 is a schematic diagram of a portion of an input circuit to be used in connection with Fig. 1, Fig. 5 is a schematic diagram of an input circuit for use with Fig. 1 when a wider null signal is desired, and Fig. 6 is a series of voltage waveforms used to explain the operation of the null detector using the input circuit of Fig. 5.

Referring now particularly to Fig. 1, there is shown a null detector, in accordance with the present invention, adapted to indicate when a varying input signal passes through a predetermined reference potential, such as ground. The signal whose null point is to be determined is applied to an input terminal 10. The terminal 10 is connected to the grid 12, of a triode tube 14, through a diode 16, in a manner to permit conventional current to flow from the terminal 10 to the grid 12. The grid 12 is connected to a source of reference potential, such as ground, through a diode 18, in a manner to permit conventional current to flow from ground to the grid 12. It will be noted that the diodes 16 and 18 are connected to each other in series opposing fashion, having a common cathode junction.

The input terminal 10 is also connected to the grid 20, of a triode tube 22, through a diode 24, in a manner to permit conventional current to flow from the grid 20 to the terminal 10. The grid 20 is connected to ground, through a diode 26, in a manner to permit conventional current to flow from the grid 20 to ground. Thus, it will be seen that the diodes 24 and 26 are connected to each other in series opposing fashion, having a common anode junction.

The triode tubes 14 and 22, which may be enclosed in the same envelope, are connected in a difference amplifier circuit. The cathodes of the triodes 14 and 22 are connected to each other and to a source of negative voltage (not shown) through a common cathode resistor 28. The anode of the triode 14 is connected directly to a source of B+ voltage (not shown), and the anode of the triode 22 is connected to a source of B+ voltage (not shown) through a variable load resistor 30. A lead 32 is connected to the anode of the triode 22 for the purpose of deriving an output signal when the input signal passes through the predetermined reference potential.

The operation of the null detector of Fig. 1 will now be described. Let it be assumed that a sawtooth voltage input signal A is applied to the input terminal 10. Let it also be desired to obtain an output signal from the null detector when the sawtooth voltage signal A passes through zero, or ground potential. It will be noted that the voltage on the grid 12 of the triode 14 will be limited to substantially zero volts when the signal A is below ground potential. This is due to the limiting action of the diode 18 which maintains the grid 12 at substantially zero potential, thereby rendering the triode 14 conductive. It will also be noted that as the signal A approaches zero it will be applied to the grid 20 of the triode 22, and will render the tube 22 conductive as soon as the voltage on the grid 20 becomes less negative than the cutoff voltage for the triode 22. As the signal A passes through the reference potential zero and becomes positive, the grid 12 of the triode 14 becomes more positive, and the triode 14 conducts more heavily. As a result of greater conduction through the triode 14, the voltage at the cathode thereof, and also at the cathode of the triode 22 to which it is tied, begins to rise because of current through the common cathode resistor 28. Consequently, the grid 20 of the triode 22 becomes more negative than the cathode of the tube 22, and conduction therethrough is cut off. As a result of the momentary conduction of current through the tube 22, as the signal A passes from a negative value, through zero, and to a positive value, a sharp output signal is derived from the anode of the tube 22.

Referring now to Fig. 2, there is shown a series of voltage waveforms wherein the abscissae represent time and the ordinates represent voltage. The waveform 34 represents the voltage on the grid 12 of the triode 14 during the time the signal A is applied to the input terminal 10. It will be noted that the grid 12 of the triode 14 is limited between substantially zero volts and some positive voltage. Consequently, the triode 14 is always in a state of conduction. Since the grid 20 of the triode 22 is limited by the diode 26 to voltages between some negative value and substantially zero, the triode 22 is rendered conductive only when the voltage, represented by the waveform 36 in Fig. 2, overcomes the cutoff bias on the tube 22. The waveform 38 of Fig. 2 represents the output signal from the anode of the triode 22 resulting from the triode 22 being rendered conductive for a short period of time. It will be noted that the output voltage 38 has the sharp peak when the input signal voltage A passes through the reference potential, zero volts. The triodes 14 and 22 should be tubes having sharp cutoff characteristics, such as tubes of the 12AX7 type. The diodes 16, 18, 24 and 26 may be germanium diodes of the 1N34 type.

When it is desired to derive an output signal from the null detector of Fig. 1 in response to a plurality of signals passing through the predetermined reference voltage simultaneously, the input circuit of Fig. 3 may be employed, in accordance with the present invention. Fig. 3 illustrates an input circuit to the grids 12 and 20 of the triodes 14 and 22 of Fig. 1 from a plurality of input terminals X, Y and Z. Input signals applied to the input terminal X are applied to the grids 12 and 20 of the tubes 14 and 22 through diodes 40 and 42, respectively. Input signals applied to the input terminal Y are applied to the grids 12 and 20 through diodes 44 and 46, respectively. Similarly, input signals applied to the input terminal Z are applied to the grids 12 and 20 through diodes 48 and 50, respectively. The diodes 40, 44 and 48 are connected to permit conventional current to flow from the input terminals X, Y and Z to the grid 12, while the diodes 42, 46 and 50 are connected between the input terminals X, Y and Z and the grid 20 to permit conventional current to flow from the grid 20 to the terminals X, Y and Z. It will be noted that each of the diodes 40, 44 and 48 is connected to the diode 18 in series opposing fashion, that is, their cathodes form a common junction which is connected to the grid 12 of the triode 14. It will be noted also that the diodes 42, 46 and 50 are connected to the diode 26 in series opposing fashion also and that their anodes are connected to a common junction which, in turn, is connected to the grid 20 of the triode 22. It will be understood that when a plurality of signals is applied to the input terminals X, Y and Z there will be an output signal from the null detector, at the anode of the triode 22, when all of the input signals pass through the reference potential.

Referring now to Fig. 4, there is shown a schematic diagram of a portion of an input circuit to derive an output signal from the null detector of Fig. 1 when the input signal passes through a predetermined voltage offset from zero, or ground potential. In this case, the input signal is applied to an input terminal 52. The terminal 52 is connected to the positive and negative terminals of a source of unidirectional voltage 54 through equal resistors 56 and 58, respectively. A potentiometer 60 is connected across the source of unidirectional potential 54, and the movable tap of the potentiometer 60 is connected to the input terminal 10 of Fig. 1. The input terminal 52 is connected to the terminal 10 through a bypass capacitor 62. With the input circuit of Fig. 4, it will be understood that an input signal voltage, of one instantaneous value, applied to the terminal 52 may be referred to the input terminal 10 at a compensating instantaneous voltage by adjusting the tap of the potentiometer 60. In this manner, an input voltage signal applied to the terminal 52 may be made to produce an output signal, at the anode of the triode 22 of the null detector of Fig. 1, as the input signal passes some predetermined value, since it is possible to convert the original input signal at the input terminal 52 to a signal at the input terminal 10 which will pass through ground potential when the signal applied to the input terminal 52 passes through the predetermined voltage.

When it is desired to broaden the null output signal, an input circuit such as shown in Fig. 5 may be employed, in accordance with the present invention. Referring now to Fig. 5, there is shown the input terminal 10 connected to the anode of the diode 16 through a resistor 64. The terminal 10 is also connected to the cathode of the diode 24 through a resistor 66 which is equal to the resistor 64. A source of unidirectional potential 68 has its negative terminal connected directly to the anode of the diode 16, and its positive terminal connected to the cathode of the diode 24 through a variable resistance 70. With the circuit shown in Fig. 5, an input signal, such as the signal A (Fig. 2) applied to the input terminal 10 will assume, at the grid 12 of the triode 14, the voltage waveform 72 shown in Fig. 6, wherein the abscissae represent time and the ordinates represent voltage. The signal on the grid 20 of the triode 22 will appear as the voltage waveform 74. The output signal from the anode of the tube 22, indicating the broadened null point, will appear as the voltage waveform 76 in Fig. 6.

If it is desired to obtain a very sharp output signal from the anode of the tube 22 of the null detector circuit of Fig. 1, the output signal (waveform 38, Fig. 2) may be amplified, shaped and clipped in any suitable manner well known in the art.

Thus there is shown and described, in accordance with the objects of the present invention, a null detector circuit wherein an output signal is derived when an input signal passes through a predetermined voltage. The null detector lends itself easily to the application of an input circuit which will accommodate a plurality of input signals and which will produce an output signal when all of the input signals pass through a predetermined voltage simultaneously. When the predetermined voltage is other than ground, or zero potential, there has been provided a compensating voltage circuit whereby the input signal may be converted from one voltage to another. Input means have also been described whereby the output signal may be broadened or narrowed if desired.

What is claimed is:

1. A circuit for indicating voltage signals passing through a reference voltage, said circuit comprising a difference amplifier comprising a first and a second electron tube each having an anode, a grid and a cathode, a resistor having one end connected to both of said cathodes, means to apply a source of negative voltage to the other end of said resistor, means to apply a source of operating potentials to each of said tubes, signal input means, means connected between said input means and said grid of said first tube to limit the voltages applied thereto to values between substantially said reference voltage and some positive voltage, and means connected between said input means and said grid of said second tube to limit the voltages applied thereto to values between substantially said reference voltage and some negative voltage.

2. A circuit for indicating voltage signals passing through a reference voltage, said circuit comprising a difference amplifier comprising a first and a second tube each having an anode, a grid and a cathode, a resistor having one end connected to both of said cathodes, means to apply a source of negative voltage to the other end of said resistor, means to apply a source of operating potentials to each of said tubes, signal input means, means connected between said input means and said grid of said first tube to limit the voltages applied thereto to values between substantially said reference voltage and some positive voltage, means connected between said input means and said grid of said second tube to limit the voltages applied thereto to values between substantially said reference voltage and some negative voltage, each of said limiting means comprising a pair of diodes connected in series opposing fashion, and means to derive an output signal from the anode of said second tube when a signal passes through said reference voltage.

3. A circuit for indicating voltage signals passing through a reference potential, said circuit comprising a difference amplifier having a first and a second tube each having an anode, a grid and a cathode, said cathodes being connected to each other, a resistor, means to apply a source of negative voltage to said cathodes through said resistor, a load resistor connected to the anode of said second tube, means to apply a source of operating potentials to each of said tubes, an input terminal, a source of reference potential, two pairs of diodes, each of said pairs of diodes being connected in series opposing relationship between said terminal and said source of reference potential, one of said pairs of diodes having a common junction between its cathodes connected to said grid of said first tube, and the other of said pairs of diodes having a common junction between its anodes and connected to said grid of said second tube.

4. A circuit for indicating voltage signals passing through a reference potential, said circuit comprising a difference amplifier having a first and a second tube each having an anode, a grid and a cathode, said cathodes being connected to each other, a resistor, means to apply a source of negative voltage to said cathodes through said resistor, a load resistor connected to the anode of said second tube, means to apply a source of operating potentials to each of said tubes, an input terminal, a source of reference potential, means to apply to said grid of said first tube a voltage substantially equal to said reference potential when said signals are below said reference potential and a positive voltage when said signals are positive, and means to apply to said grid of said second tube a voltage substantially equal to said reference potential when said signals are above said reference potential and a negative voltage when said signals are negative.

5. A circuit for indicating voltage signals passing through a reference potential, said circuit comprising a difference amplifier having a first and a second tube each having an anode, a grid and a cathode, said cathodes being connected to each other, a resistor, means to apply a source of negative voltage to said cathodes through said resistor, a load resistor connected to the anode of said second tube, means to apply a source of operating potential to each of said tubes, an input terminal, a source of reference potential, means to apply to said grid of said first tube a voltage substantially equal to said reference potential when said signals are below said reference potential and a positive voltage when said signals are positive, and means to apply to said grid of said second tube a voltage substantially equal to said reference potential when said signals are above said reference potential and a negative voltage when said signals are negative, said voltages applied to said grid of said first tube by said voltage applying means being of sufficient magnitude to render said first tube conductive continuously.

6. A circuit for indicating when a plurality of signals pass through a reference voltage at the same time, said circuit comprising a difference amplifier comprising a pair of tubes each having a cathode, a grid and an anode, a resistor, means to apply a source of negative voltage to said cathodes through said resistor, means to apply operating potentials to each of said tubes, signal input means comprising a plurality of terminals, a plurality of pairs of diodes connected in series opposing fashion, each of said terminals being connected to said grids of said pair of tubes through a separate pair of diodes for each grid, the pairs of diodes connected to one grid of said amplifier being connected in a manner to permit current to flow in an opposite direction from that permitted by the pairs of diodes connected to the other grid of said amplifier.

7. A null detector comprising a first and a second electron discharge device each having an anode, a grid and a cathode, a common cathode resistor, means to apply a source of negative potential to said cathodes through said common resistor, a load resistor connected to the anode of said second device, means to apply operating voltages to said devices, an input terminal, a source of reference potential, means to apply input signals to the grids of said devices, means to limit the signals applied to the grid of said first device to substantially said reference voltage and to positive values of said signals, and means to limit the signals applied to said grid of said second device to substantially said reference voltage and to negative values of said signals.

8. A null detector comprising a first and a second electron discharge device each having an anode, a grid and a cathode, a common cathode resistor, means to apply a source of negative potential to said cathodes through said common resistor, a load resistor connected to the anode of said second device, means to apply operating voltages to said devices, an input terminal, a source of reference potential, means to apply input signals to the grids of said devices, means to limit the signals applied to the grid of said first device to substantially said reference voltage and positive values of said signals, and means to limit the signals applied to said grid of said second device to substantially said reference voltage and negative values of said signals, said means to limit signals applied to said grid of said first device including means connected to the grid thereof to render said first device conductive continuously.

9. A null detector comprising a first and a second electron discharge device each having an anode, a grid and a cathode, a common cathode resistor, means to apply a source of negative potential to said cathodes through said common resistor, a load resistor connected to the anode of said second device, means to apply operating voltages to said devices, an input terminal, a source of reference potential, means to apply input signals to the grids of said devices, means to limit the signals applied to the grid of said first device to substantially said reference voltage and positive values of said signals, means to limit the signals applied to said grid of said second device to substantially said reference voltage and negative values of said signals, said means to limit signals applied to said grid of said first device including means connected to the grid thereof to render said first device conductive continuously, and said means to limit signals applied to the grid of said second device including means connected to the grid thereof to render said second device conductive only when said input signal approaches said reference voltage.

10. A null detector comprising a first and a second electron discharge device each having an anode, a grid and a cathode, a common cathode resistor, means to apply a source of negative potential to said cathodes through said common resistor, a load resistor connected to the anode of said second device, means to apply operating voltages to said devices, an input terminal, a source of reference potential, a first diode having an anode connected to said terminal and a cathode connected to the grid of said first device, a second diode having an anode connected to said source of reference potential and a cathode connected to the grid of said first device, a third diode having a cathode connected to said terminal and an anode connected to the grid of said second device, and a fourth diode having a cathode connected to said source of reference potential and an anode connected to said grid of said second device.

11. A null detector comprising a first and a second electron discharge device each having an anode, a grid and a cathode, a common resistor, means to apply a source of negative potential to said cathodes through said common resistor, a load resistor connected to the anode of said second device, means to apply operating voltages to said devices, an input terminal, a source of reference potential, a first diode having an anode connected to said terminal and a cathode connected to the grid of said first device, a second diode having an anode connected to said source of reference potential and a cathode connected to the grid of said first device, a third diode having a cathode connected to said terminal and an anode connected to the grid of said second device, and a fourth diode having a cathode connected to said source of reference potential and an anode connected to said grid of said second device, means to derive an output signal from said anode of said second device, and means connected between said input terminal and said first and third diodes to widen said output signal.

12. A null detector comprising a first and a second electron discharge device each having an anode, a grid and a cathode, a common cathode resistor, means to apply a source of negative potential to said cathodes through said common resistor, a load resistor connected to the anode of said second device, means to apply operating voltages to said devices, a source of reference potential, a plurality of input terminals, a first diode having an anode connected to said source of reference potential and a cathode connected to said grid of said first device, a second diode having a cathode connected to said source of reference potential and an anode connected to said grid of said second device, a plurality of additional diodes each having a cathode and an anode, each of said terminals being connected to said grid of said first device through a separate one of said additional diodes, and to the grid of said second device through a separate one of said additional diodes, said diodes connected to said first device having their cathodes connected to the grid of said first device, and said diodes connected to said second device having their anodes connected to the grid of said second device.

References Cited in the file of this patent

UNITED STATES PATENTS

| | | |
|---|---|---|
| 2,480,201 | Selove | Aug. 30, 1949 |
| 2,497,693 | Shea | Feb. 14, 1950 |
| 2,679,588 | Henry | May 25, 1954 |